United States Patent
Iwama et al.

(10) Patent No.: US 10,393,162 B2
(45) Date of Patent: Aug. 27, 2019

(54) JOINT PART AND MANUFACTURING METHOD THEREFOR

(71) Applicant: AISIN AW CO., LTD., Anjo-shi, Aichi-ken (JP)

(72) Inventors: Takashi Iwama, Nishio (JP); Hiroyuki Ono, Anjo (JP); Takeshi Torii, Chiryu (JP); Keisuke Nakashima, Nishio (JP); Yusuke Miyamoto, Nagoya (JP); Tetsuya Aoyama, Gamagori (JP)

(73) Assignee: AISIN AW CO., LTD., Anjo (JP)

( * ) Notice: Subject to any disclaimer, the term of this patent is extended or adjusted under 35 U.S.C. 154(b) by 267 days.

(21) Appl. No.: 15/540,739

(22) PCT Filed: Mar. 18, 2016

(86) PCT No.: PCT/JP2016/058805
§ 371 (c)(1),
(2) Date: Jun. 29, 2017

(87) PCT Pub. No.: WO2016/148292
PCT Pub. Date: Sep. 22, 2016

(65) Prior Publication Data
US 2017/0370389 A1    Dec. 28, 2017

(30) Foreign Application Priority Data
Mar. 19, 2015 (JP) .................................. 2015-056353

(51) Int. Cl.
*B23K 15/04*      (2006.01)
*F16B 7/00*      (2006.01)
(Continued)

(52) U.S. Cl.
CPC ................ *F16B 7/00* (2013.01); *B23K 15/00* (2013.01); *B23K 15/0053* (2013.01);
(Continued)

(58) Field of Classification Search
CPC ...... B23K 26/28; B23K 26/282; B23K 15/00; B23K 15/0053; B23K 15/04; F16B 5/08; F16D 13/60
See application file for complete search history.

(56) References Cited

U.S. PATENT DOCUMENTS 3,488,830 A * 1/1970 Miller .................... B23K 15/04
                                                219/160
4,063,062 A * 12/1977 Kuhnen ............. B23K 15/0053
                                                219/121.14

(Continued)

FOREIGN PATENT DOCUMENTS

JP       S57-047588 A     3/1982
JP       H10-272586 A    10/1998
(Continued)

OTHER PUBLICATIONS

May 24, 2016 International Search Report issued in Patent Application No. PCT/JP2016/058805.

*Primary Examiner* — Daniel J Wiley
(74) *Attorney, Agent, or Firm* — Oliff PLC (57) ABSTRACT

A manufacturing method for a joint part in which a first metal piece and a second metal piece are joined to each other by performing welding by irradiating a high-energy beam to a joint surface on which the first metal piece and the second metal piece face each other, the first metal piece including a first flow path for passage of a fluid provided at a specific depth from a surface on a side exposed to the high-energy beam, the second metal piece including a second flow path for passage of the fluid provided at a specific depth from the surface on the side exposed to the high-energy beam, and the first flow path and the second flow path being coupled to each other on the joint surface.

18 Claims, 6 Drawing Sheets

(51) Int. Cl.
  *B23K 15/00*   (2006.01)
  *B23K 26/28*   (2014.01)
  *F16D 13/60*   (2006.01)
  *F16D 25/0638*   (2006.01)
  *B23K 26/282*   (2014.01)
  *F16B 5/08*   (2006.01)
  *B23K 101/06*   (2006.01)

(52) U.S. Cl.
  CPC .............. *B23K 15/04* (2013.01); *B23K 26/28* (2013.01); *B23K 26/282* (2015.10); *F16B 5/08* (2013.01); *F16D 13/60* (2013.01); *F16D 25/0638* (2013.01); *B23K 2101/06* (2018.08)

(56) References Cited

U.S. PATENT DOCUMENTS

| | | | | | |
|---|---|---|---|---|---|
| 4,176,270 | A | * | 11/1979 | Sailas | B23K 15/0053 219/121.14 |
| 4,553,015 | A | * | 11/1985 | Ishii | B23K 15/04 219/121.13 |
| 4,639,571 | A | * | 1/1987 | Lewandowski | B23K 15/00 219/121.13 |
| 5,211,327 | A | * | 5/1993 | Clarke | B23K 10/02 228/174 |
| 6,381,842 | B2 | * | 5/2002 | Kato | B23K 15/04 29/888.022 |
| 6,589,671 | B1 | * | 7/2003 | Kehrer | B23K 15/0073 428/683 |
| 9,156,110 | B2 | * | 10/2015 | Chen | B60K 17/165 |
| 2004/0169022 | A1 | * | 9/2004 | Mega | B23K 26/206 219/121.64 |
| 2016/0016258 | A1 | * | 1/2016 | Li | B23K 35/3033 403/272 |
| 2017/0080530 | A1 | * | 3/2017 | McGhee | B23P 6/005 |
| 2017/0089440 | A1 | * | 3/2017 | Shirakawa | B23K 15/0006 |
| 2017/0129051 | A1 | * | 5/2017 | Li | B23K 26/323 |

FOREIGN PATENT DOCUMENTS

| | | |
|---|---|---|
| JP | 2010-056196 A | 3/2010 |
| JP | 2012-067889 A | 4/2012 |
| JP | 2014-101926 A | 6/2014 |
| JP | 2014-101927 A | 6/2014 |

\* cited by examiner

JOINT PART AND MANUFACTURING METHOD THEREFOR

BACKGROUND

The present disclosure relates to a joint part constituted from a plurality of metal pieces welded to each other, and to a manufacturing method therefor.

To form a housing, a cover, or the like for a variety of mechanical parts, a plurality of metal pieces (base materials) are occasionally welded to each other using a high-energy beam such as an electron beam and a laser beam because of a constraint related to forming or the like.

For example, the method of laser butt welding for metal pipes according to Japanese Patent Application Publication No. 10-272586 includes a step of performing temporary welding of a butt portion at a fusing depth that is smaller than the pipe thickness, and a step of performing main welding of the entire circumference of the butt portion by fusing the pipes through the entire range in the pipe thickness direction.

SUMMARY

However, the welding method which uses a high-energy beam according to the related art such as that described in Japanese Patent Application Publication No. 10-272586 does not assume, at all, a case where a flow path is present at a butt portion of the base materials at which welding is to be performed. If the welding method according to Japanese Patent Application Publication No. 10-272586 is adopted for a structure in which a flow path is present at a butt portion at which welding is to be performed, a portion of the butt portion around the flow path may be fused since welding is performed over the entire circumference of the butt portion. If the portion around the flow path is fused, the flow path may be narrowed or blocked. For a structure in which a flow path is present at a butt portion at which welding is to be performed, further, it is necessary to prevent leakage of a fluid from the flow path via the butt portion.

An exemplary aspect of the present disclosure attempts to provide a joint part in which two metal pieces that have a flow path are joined to each other and which secures the flow path, prevents leakage of a fluid from the flow path, and further secures the joint strength of the metal pieces, and a manufacturing method for the joint part.

An exemplary aspect of the present disclosure provides a manufacturing method for a joint part in which a first metal piece and a second metal piece are joined to each other by performing welding by irradiating a high-energy beam to a joint surface on which the first metal piece and the second metal piece face each other, the first metal piece including a first flow path for passage of a fluid provided at a specific depth from a surface on a side exposed to the high-energy beam, the second metal piece including a second flow path for passage of the fluid provided at a specific depth from the surface on the side exposed to the high-energy beam, and the first flow path and the second flow path being coupled to each other on the joint surface, the manufacturing method including: performing a first welding in which welding is performed at a fusing depth that does not reach a coupling between the first flow path and the second flow path in a first range of the joint surface, the first range including a specific portion that overlaps the coupling as seen from the surface side that is exposed to the high-energy beam; and performing a second welding in which welding is performed at a fusing depth that is larger than the fusing depth of the first welding in a second range of the joint surface, the second range excluding the specific portion.

Another exemplary aspect of the present disclosure provides a joint part that includes a first metal piece and a second metal piece joined to the first metal piece on a joint surface on which the first metal piece and the second metal piece face each other, wherein the first metal piece including a first flow path for passage of a fluid provided at a specific depth from a specific surface, the second metal piece including a second flow path for passage of the fluid provided at a specific depth from the specific surface, and the first flow path and the second flow path being coupled to each other on the joint surface; a small bead portion with a fusing depth that does not reach a coupling between the first flow path and the second flow path is provided in a first range of the joint surface, the first range including a specific portion that overlaps the coupling as seen from the specific surface side; and a large bead portion with a fusing depth that is larger than the fusing depth of the small bead portion is provided in a second range of the joint surface, the second range excluding the specific portion.

In the manufacturing method for a joint part described above, contrivances are made when welding is performed by irradiating a high-energy beam in the case where the coupling between the first flow path and the second flow path is positioned on the joint surface between the first metal piece and the second metal piece.

Specifically, a first welding is performed at a fusing depth that does not reach the coupling in a first range of the joint surface. The first range of the joint surface is defined as a range that includes the specific portion which overlaps the coupling between the first flow path and the second flow path as seen from the surface side that is exposed to the high-energy beam.

With the first welding, in which the fusing depth of the welding is small, it is possible to prevent portions of the first metal piece and the second metal piece positioned around the coupling from being fused. Consequently, it is possible to prevent the first flow path and the second flow path from being narrowed or blocked, and to protect the coupling from fusion due to the welding. With the first welding, in addition, the welding can be performed in a short time, and the amount of thermal deformation of the first metal piece and the second metal piece due to thermal distortion due to the welding can be suppressed to be small.

In addition, a second welding is performed at a fusing depth that is larger than the fusing depth of the first welding in a second range of the joint surface. The second range of the joint surface is defined as a range that excludes the specific portion. With the second welding, in which the fusing depth of the welding is large, it is possible to appropriately secure the joint strength between the first metal piece and the second metal piece.

With the combination of the first welding and the second welding, in addition, either the first welding or the second welding is performed over the entire range of the joint surface as seen from the surface side that is exposed to the high-energy beam. Therefore, the air-tightness of the coupling between the first flow path and the second flow path on the surface exposed to the high-energy beam is secured. It is possible to prevent leakage of the fluid from the coupling to the surface exposed to the high-energy beam. Therefore, the structure which protects the coupling from fusion due to the welding and which secures the air-tightness of the coupling can be simplified.

Thus, with the manufacturing method for a joint part described above, it is possible to manufacture a joint part that makes it possible to protect the coupling between the first flow path and the second flow path, to prevent leakage of the fluid from the first flow path and the second flow path, and to further secure the joint strength of the first metal piece and the second metal piece.

The joint part described above has the coupling between the first flow path and the second flow path on the joint surface between the first metal piece and the second metal piece. The state of formation of welding beads in the joint part is different between the first range of the joint surface and the second range of the joint surface.

Specifically, a small bead portion with a fusing depth that does not reach the coupling is provided in the first range of the joint surface. With the formation of the small bead portion, it is possible to protect the coupling between the first flow path and the second flow path from fusion due to the welding. On the other hand, a large bead portion with a fusing depth that is larger than the fusing depth of the small bead portion is provided in the second range of the joint surface. With the formation of the large bead portion, it is possible to appropriately secure the joint strength between the first metal piece and the second metal piece. With the combination of the small bead portion and the large bead portion, in addition, either the small bead portion or the large bead portion is provided over the entire range of the joint surface as seen from the specific surface side. Therefore, it is possible to prevent leakage of the fluid from the coupling between the first flow path and the second flow path to the specific surface.

The "specific surface" refers to a surface on the side on which welding beads of the small bead portion and the large bead portion are formed. The "specific surface" is also a surface on the side exposed to the high-energy beam.

Thus, with the joint part described above, it is possible to protect the coupling between the first flow path and the second flow path, to prevent leakage of the fluid from the first flow path and the second flow path, and to further secure the joint strength of the first metal piece and the second metal piece.

DETAILED DESCRIPTION OF EMBODIMENTS

Preferable embodiments of the joint part and the manufacturing method therefor discussed above will be described.

In the joint part and the manufacturing method therefor, the specific depth at which the first flow path is provided in the first metal piece and the specific depth at which the second flow path is provided in the second metal piece can be in the vicinity of the surface on the side exposed to the high-energy beam. The specific depth may be smaller than the fusing depth of the second welding. More specifically, the specific depth may be a depth of 2 to 10 mm from the surface on the side exposed to the high-energy beam.

In the manufacturing method for a joint part described above, the second welding may be performed after the first welding is performed.

In this case, temporary fixation between the first metal piece and the second metal piece can be perforated through the first welding in which the fusing depth of the welding is small, and thereafter welding between the first metal piece and the second metal piece can be performed through the second welding in which the fusing depth of the welding is large. Therefore, deformation of the first metal piece and the second metal piece due to thermal distortion due to the welding can be hindered if the first metal piece and the second metal piece have been temporarily fixed to each other when the second welding is performed.

The second welding may be started while the first welding is being performed.

The first welding may be performed after the second welding is performed.

In this case, the second welding in which the fusing depth of the welding is larger is performed earlier than the first welding in which the fusing depth of the welding is smaller. The first welding is performed after fusing is performed not only near the surfaces of the first metal piece and the second metal piece but also to the depths of the first metal piece and the second metal piece in the second welding. Therefore, a clearance is not likely to be formed in the depths of the joint surface between the first metal piece and the second metal piece, and it is possible to effectively secure the air-tightness of the coupling portion between the first flow path and the second flow path.

The first welding may be started while the second welding is being performed. In this case, the first welding may be started at a portion at which the second welding has already been performed.

The first range may be an entire range of the joint surface as seen from the surface side that is exposed to the high-energy beam.

In this case, the first welding can be performed continuously over the entire range of the joint surface, and control for starting and ending the first welding can be simplified.

In the joint part and the manufacturing method therefor described above, the first metal piece may be an outer metal piece that has a through hole, the second metal piece may be an inner metal piece fitted into the through hole, and the joint surface may be formed by an inner peripheral surface of the through hole and an outer peripheral surface of the inner metal piece.

In this case, it is possible to protect the coupling portion between the first flow path and the second flow path, to prevent leakage of the fluid from the first flow path and the second flow path, and to further secure the joint strength of the first metal piece and the second metal piece by performing the first welding and the second welding on the joint surface which is annular.

In the manufacturing method for a joint part described above, the specific portion may be formed at a plurality of locations on the joint surface as seen from the surface side that is exposed to the high-energy beam, and the second welding may be performed through continuous reciprocation of a position of irradiation of the high-energy beam between two adjacent specific portions alternately in a first direction from one of the specific portions toward the other specific portion along the joint surface and a second direction that is opposite to the first direction.

When welding is performed at a constant speed in one direction on the joint surface between the first metal piece and the second metal piece, the amount of input heat is small and the fusing depth of the welding is small at the welding start portion (start-up portion) and the welding end portion (finish portion). In the case where the specific portion is formed at a plurality of locations on the joint surface, in particular, the second welding is performed intermittently in a plurality of second ranges of the joint surface, and therefore a large number of welding start portions and welding end portions of the second welding are formed.

Thus, the second welding is performed by continuously moving the position of irradiation of the high-energy beam alternately in the first direction and the second direction between two adjacent specific portions. Consequently, welding is performed repeatedly at the welding start portion and the welding end portion. Therefore, it is possible to secure the amount of heat input to the welding start portion and the welding end portion, and to make the fusing depth over the entire second range of the joint surface more uniform.

In the joint part described above, the joint part which is constituted from the first metal piece and the second metal piece may be a clutch drum, the clutch drum may define an oil chamber for engagement of a clutch together with a piston housed in the clutch drum, and the first flow path and the second flow path may be formed as oil paths that supply working oil to the oil chamber.

The joint part and the manufacturing method therefor described above can be adopted to manufacture a clutch drum. The joint part and the manufacturing method therefor described above can also be adopted to manufacture a variety of parts other than the clutch drum.

In the joint part and the manufacturing method therefor described above, the high-energy beam may be an electron beam, a laser beam, an ion beam, or the like. Electron beam welding which uses the electron beam utilizes the collision of an electron discharged from a filament. Laser beam welding which uses the laser beam utilizes heat generated from the laser beam. Ion beam welding which uses the ion beam utilizes a beam generated by accelerating ions in the electric field.

Embodiments

A joint part and a manufacturing method therefor according to embodiments will be described below with reference to the drawings.

First Embodiment

Figure 1:
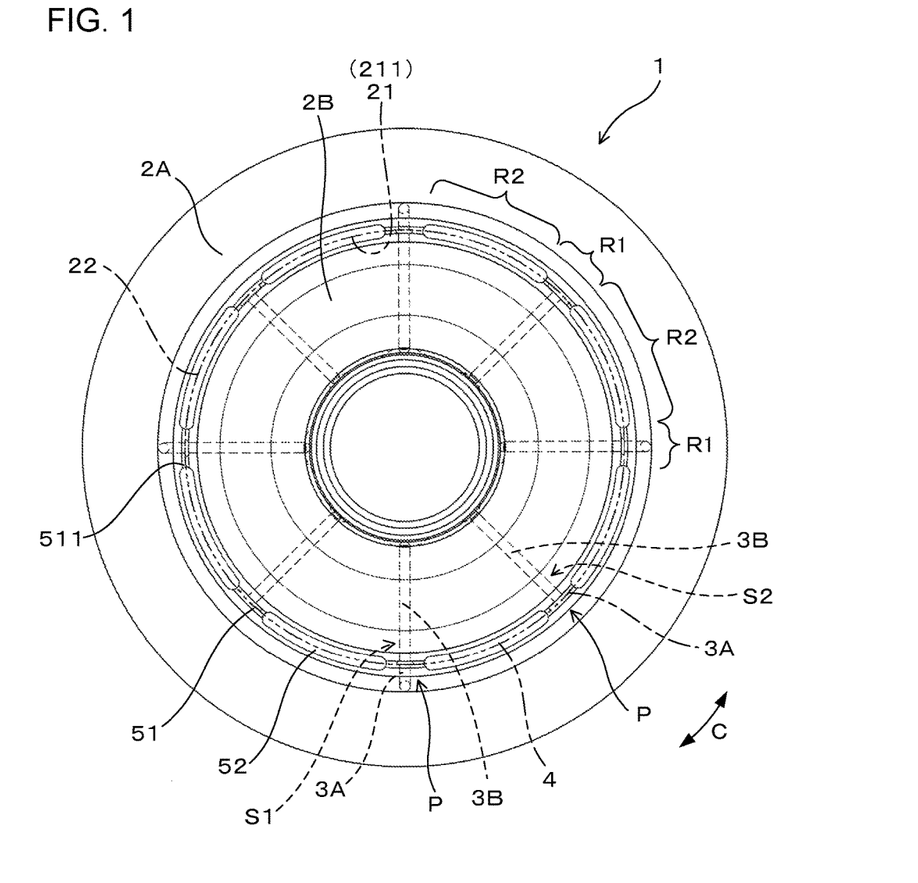
FIG. 1 illustrates a joint part according to a first embodiment as viewed in plan.
Figure 2:
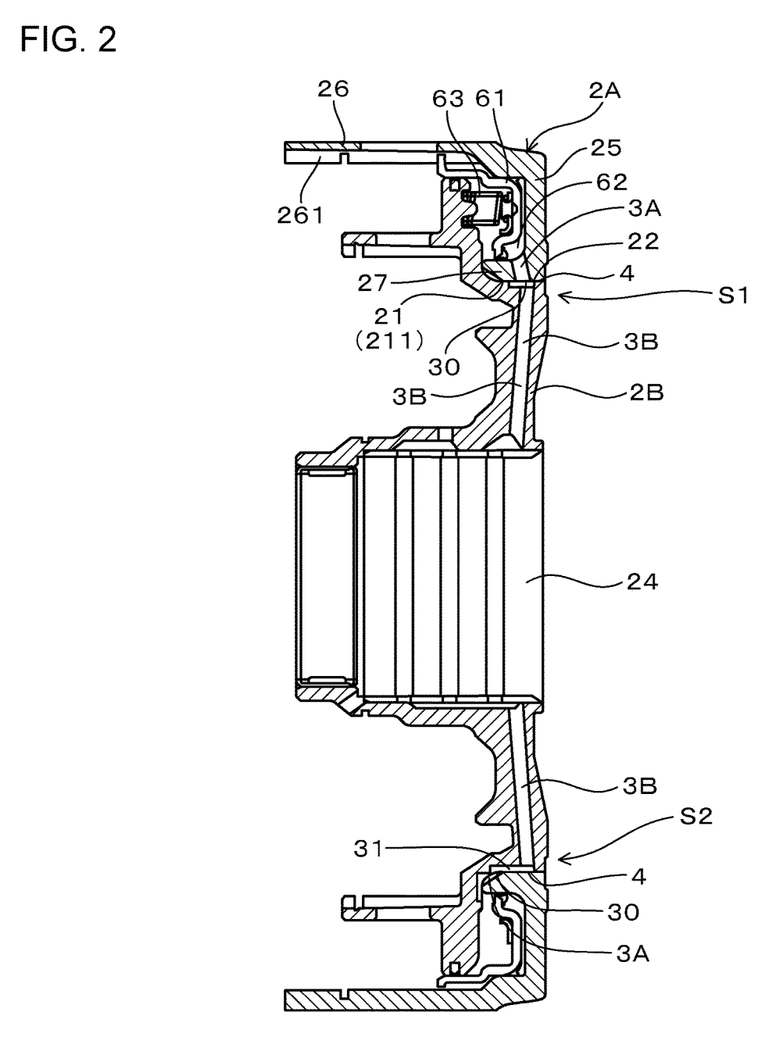
FIG. 2 illustrates the joint part according to the first embodiment as viewed in section.

As illustrated in FIGS. 1 and 2, a joint part 1 according to an embodiment is constituted from two metal pieces 2A and 2B welded to each other. The outer metal piece 2A which serves as a first metal piece and the inner metal piece 2B which serves as a second metal piece are joined to each other by performing welding through emission of a high-energy beam to a joint surface 4 on which the outer metal piece 2A and the inner metal piece 2B face each other. The outer metal piece 2A includes a first flow path 3A for passage of a fluid provided at a specific depth from a surface 23 on the side exposed to the high-energy beam. The inner metal piece 2B includes a second flow path 3A for passage of the fluid provided at the specific depth from the surface 23 on the side exposed to the high-energy beam. The second flow path 3B and the first flow path 3A are coupled to each other on the joint surface 4.

Figure 3:
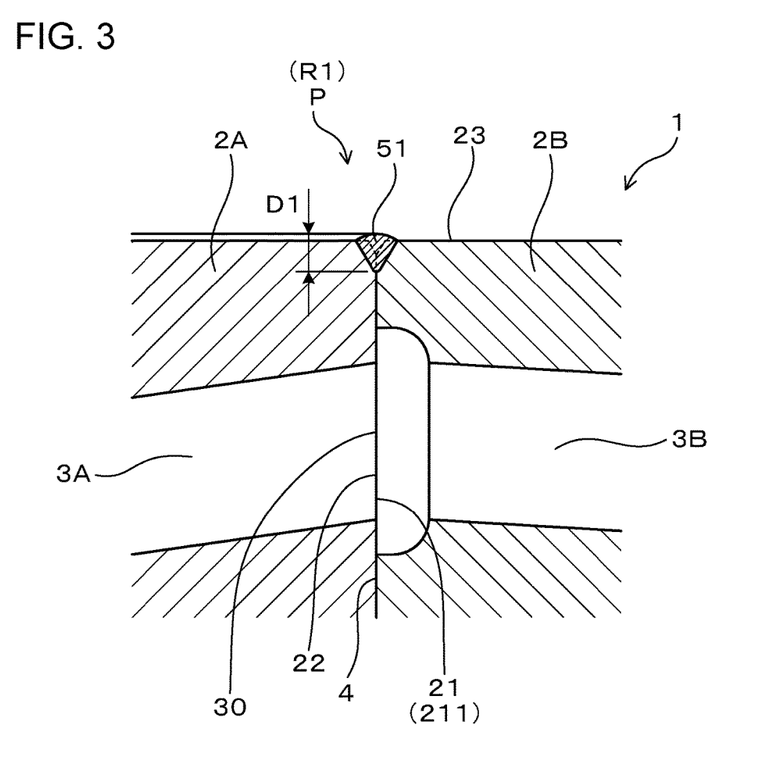
FIG. 3 illustrates a portion around a small bead portion provided in a first range of a joint surface of the joint part according to the first embodiment as viewed in section.
Figure 4:
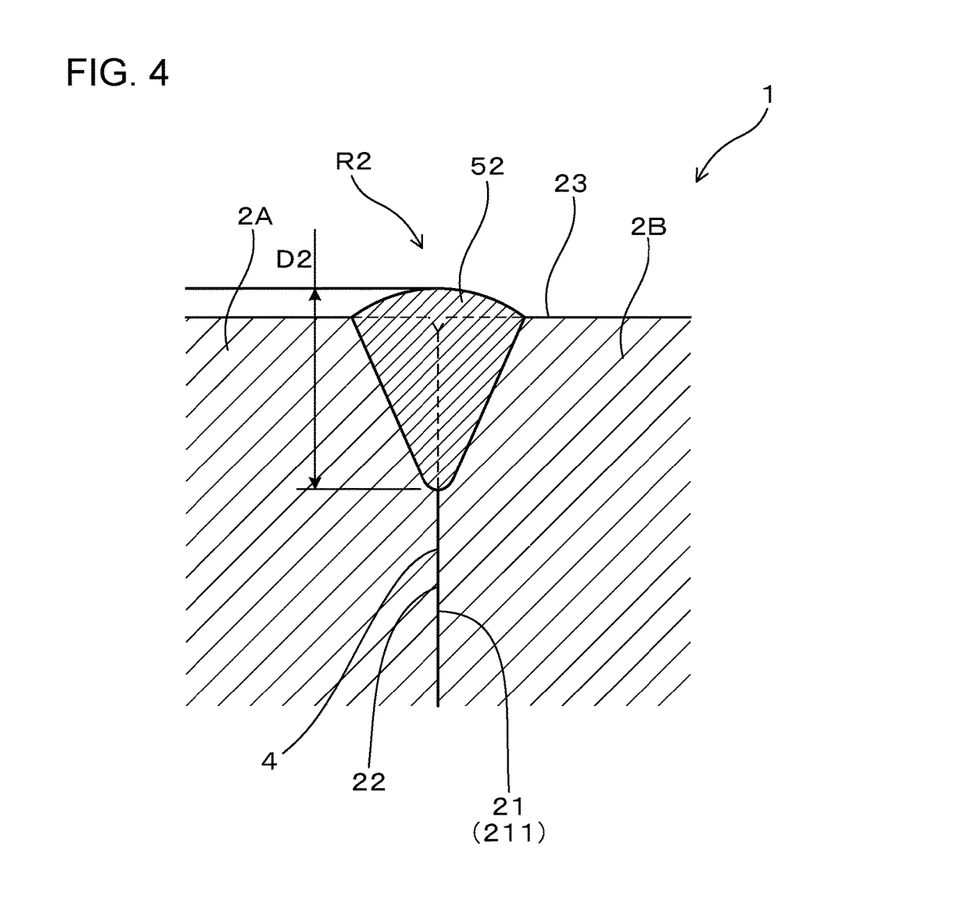
FIG. 4 illustrates a portion around a large bead portion provided in a second range of the joint surface of the joint part according to the first embodiment as viewed in section.

As illustrated in FIG. 3, a small bead portion 51 with a fusing depth D1 that does not reach a coupling portion 30 (i.e., coupling) between the first flow path 3A and the second flow path 3B is provided in a first range R1 of the joint surface 4 which includes a specific portion P that overlaps the coupling portion 30 when seen from the surface 23 side that is exposed to the high-energy beam. As illustrated in FIG. 4, a large bead portion 52 with a fusing depth D2 that is larger than the fusing depth D1 of the small bead portion 51 is provided in a second range R2, other than the first range R1, of the joint surface 4.

First, the joint part 1 according to the embodiment will be described.

As illustrated in FIGS. 1 and 2, the joint part 1 is a clutch drum for use in an automatic transmission, and is constituted from an aluminum material. The two metal pieces 2A and 2B which constitute the joint part 1 are the outer metal piece 2A which has a through hole 21, and the inner metal piece 2B which is fitted into the through hole 21. The outer metal piece 2A and the inner metal piece 2B are integrated with each other by welding to constitute a clutch drum. The joint surface 4 on which the two metal pieces 2A and 2B are joined to each other is formed in a circular shape by an inner peripheral surface 211 of the through hole 21 of the outer metal piece 2A and an outer peripheral surface 22 of the inner metal piece 2B.

The two metal pieces 2A and 2B are formed in a cylindrical shape that has a partial bottom portion. A plurality of (in the embodiment, eight) first flow paths 3A and second flow paths 3B are formed to extend radially about a center portion 24 of the inner metal piece 2B.

Welding with a high-energy beam according to the embodiment is performed in a circumferential direction C of the outer metal piece 2A and the inner metal piece 2B. The circumferential direction C in which welding with a high-energy beam is performed can also be expressed as an irradiation direction C of the position of irradiation of the high-energy beam onto the joint surface 4. The specific portion P is a portion on the circular joint surface 4 between the outer metal piece 2A and the inner metal piece 2B, which is provided with a coupling portion 30 between the first flow path 3A and the second flow path 3B. The specific portion P is formed at a plurality of (in the embodiment, eight) locations in the circumferential direction C of the circular joint surface 4. The small bead portion 51 and the large bead portion 52 are formed at a plurality of locations in the circumferential direction C.

In addition, as illustrated in FIG. 1, the first range R1 which includes the specific portion P is a range with a width that is larger than the width of the coupling portion 30 between the first flow path 3A and the second flow path 3B in the circumferential direction C. The first range R1 may be a range with a width that is twice to three times the width of the coupling portion 30 in the circumferential direction C, and the coupling portion 30 may be set as the center of the first range R1 in the circumferential direction C.

As illustrated in FIG. 2, the clutch drum as the joint part 1 defines an oil chamber 62 for engagement of a clutch together with a piston 61 housed in the clutch drum. The piston 61 for actuation of the clutch is slidably disposed inside the outer metal piece 2A. The oil chamber 62 to which working oil for sliding the piston 61 is supplied is formed between the piston 61 and the outer metal piece 2A. The first flow path 3A and the second flow path 3B are formed as oil paths that supply working oil to the oil chamber 62.

As illustrated in the drawing, the outer metal piece 2A has a bottom surface portion 25, an outer peripheral cylindrical portion 26 provided to extend upright from an outer peripheral end portion of the bottom surface portion 25, and an inner peripheral cylindrical portion 27 provided to extend upright from an inner peripheral end portion of the bottom surface portion 25. The first flow path 3A communicates with the oil chamber 62 which is surrounded by the bottom surface portion 25, the outer peripheral cylindrical portion 26, the inner peripheral cylindrical portion 27, and the piston 61.

The piston 61 is configured to be slid, when the pressure of working oil supplied to the oil chamber 62 is increased, to press a plurality of separator plates (not illustrated) fitted with a tooth-shaped portion 261 formed on the inner peripheral surface of the outer peripheral cylindrical portion 26 of the outer metal piece 2A. Friction plates fitted with a different member (hub) (not illustrated) are disposed between the plurality of separator plates. The clutch drum which is constituted from the outer metal piece 2A and the inner metal piece 2B and the different member (hub) (not illustrated) are engaged with each other so as to be rotatable together. In addition, the piston 61 is configured to be slid by a spring 63 to an original position when the pressure of working oil supplied to the oil chamber 62 is lowered.

As illustrated in FIG. 2, the first flow path 3A in the outer metal piece 2A and the second flow path 3B in the inner metal piece 2B communicate with each other on the joint surface 4 in a variety of forms. As indicated in a first portion S1 of FIG. 2, the first flow path 3A and the second flow path 3B may be provided in the outer metal piece 2A and the inner metal piece 2B, respectively, as holes that extend in the radial direction. As indicated in a second portion S2 of FIG. 2, the first flow path 3A may be provided in the shape of a groove near the joint surface 4 in the outer metal piece 2A, and the second flow path 3B may be provided in the shape of a hole that extends in the radial direction in the inner metal piece 2B. In addition, as indicated in the first portion S1 and the second portion S2, a groove portion 31 may be formed in the coupling portion 30 between the first flow path 3A and the second flow path 3B.

In the joint part 1 which is constituted from the outer metal piece 2A and the inner metal piece 2B, the joint strength is secured by the large bead portion 52, and the air-tightness of the coupling portion 30 between the first flow path 3A and the second flow path 3B is secured by the small bead portion 51. The small bead portion 51 according to the embodiment seals a clearance formed in the coupling portion 30, which is positioned on the joint surface 4, from the surface 23 exposed to a high-energy beam (the surface 23 on the side on which fusing due to the welding is started).

Even if working oil in the flow paths 3A and 3B is infiltrated along the joint surface 4, the working oil is prevented from leaking out to the surface 23 with a portion of the joint surface 4 on the surface 23 side sealed by the small bead portion 51 and the large bead portion 52. The sealing structure for the coupling portion 30 can be simplified by providing the small bead portion 51 with a function to secure the air-tightness of the coupling portion 30 between the first flow path 3A and the second flow path 3B. In addition, the shape of the flow paths 3A and 3B is protected from fusing due to the welding with the small bead portion 51 formed at a portion of the joint surface 40 at which the coupling portion 30 is formed.

The small bead portion 51 also functions as temporary welding between the outer metal piece 2A and the inner metal piece 2B. As illustrated in FIG. 1, the large bead portion 52 is formed after the small bead portion 51 is formed in the joint part 1, and an end portion of the large bead portion 52 overlaps an exposed end portion 511 (an end portion positioned at the boundary with the large bead portion 52) of the small bead portion 51 from above.

As illustrated in FIGS. 3 and 4, the fusing depth D1 of the small bead portion 51 is a minimum fusing depth that enables high-energy beam welding such as electron beam welding or laser beam welding. The fusing depth D1 of the small bead portion 51 may be 0.5 to 2 mm, for example. Meanwhile, the fusing depth D2 of the large bead portion 52 is a fusing depth that provides a sufficient joint strength between the two metal pieces 2A and 2B. The fusing depth D2 of the large bead portion 52 may be 4 to 10 mm, for example.

Next, a manufacturing method for the joint part 1 according to the embodiment will be described.

In the manufacturing method for the joint part 1 according to the embodiment, welding is performed along the circumferential direction C of circular the joint surface 4 on which the outer metal piece 2A and the inner metal piece 2B face each other to obtain the joint part 1 in which the outer metal piece 2A and the inner metal piece 2B are joined to each other. In the manufacturing method according to the embodiment, the outer metal piece 2A and the inner metal piece 2B are joined to each other such that the first flow path 3A and the second flow path 3B are connected to each other through the joint surface 4. In the manufacturing method according to the embodiment, the outer metal piece 2A and the inner metal piece 2B are joined to each other by performing electron beam welding, which is fusion welding in which base materials are fused to be joined to each other, in two stages using a single welding device.

First, as a preparation process, as illustrated in FIG. 2, the inner metal piece 2B is fitted into the through hole 21 of the outer metal piece 2A to assemble the outer metal piece 2A and the inner metal piece 2B to each other. In this event, the inside diameter of the through hole 21 of the outer metal piece 2A is slightly smaller than the outside diameter of the inner metal piece 29, and the inner metal piece 2B is fitted into the outer metal piece 2A by press fitting. Consequently, the entire circumference of the inner metal piece 2B can be in tight contact with the entire circumference of the outer metal piece 2A so that no clearance is formed over the entire circumference of the joint surface 4 between the outer metal piece 2A and the inner metal piece 2B.

Figure 5:
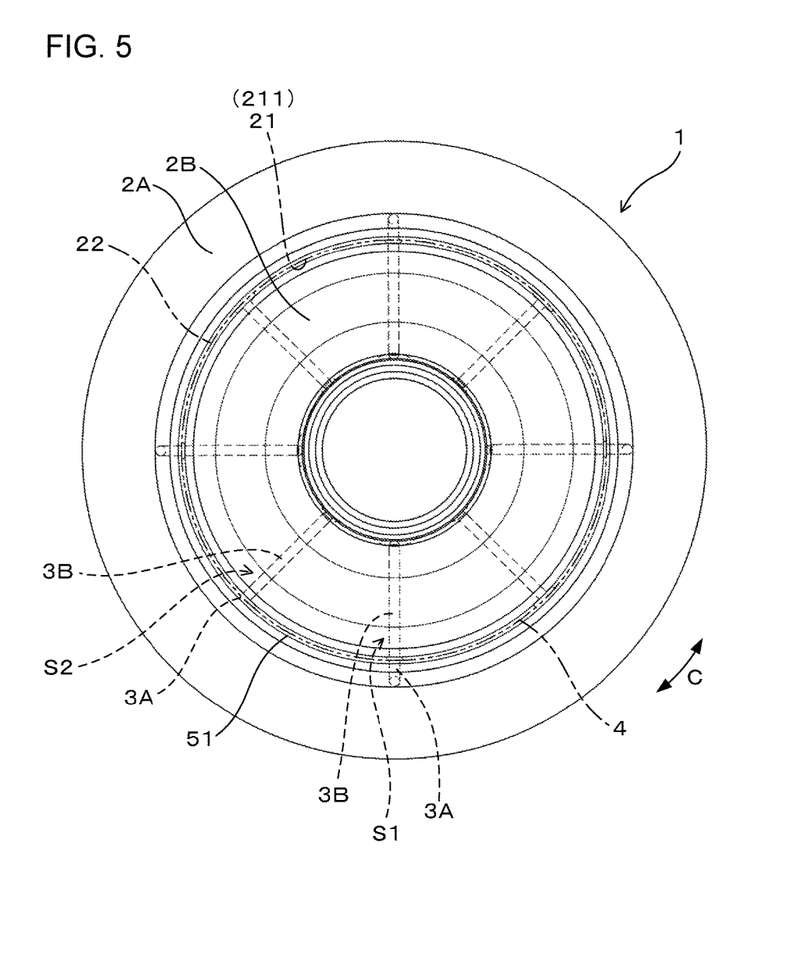
FIG. 5 illustrates the joint part according to the first embodiment in which the small bead portion is formed as viewed in plan.

Then, as a first welding process, as illustrated in FIGS. 3 and 5, an electron beam is irradiated to the entire range, in the circumferential direction C, of the circular joint surface 4 constituted from the inner peripheral surface 211 of the through hole 21 of the outer metal piece 2A and the outer peripheral surface 22 of the inner metal piece 2B (the entire range of the joint surface 4 as seen from the surface 23 side that is exposed to the high-energy beam) to perform first welding at the fusing depth D1 which does not reach the first flow path 3A and the second flow path 39. It is only necessary that the clearance between the inner peripheral surface 211 of the through hole 21 of the outer metal piece 2A and the outer peripheral surface 22 of the inner metal piece 2B should be blocked from the surface 23 side of the outer metal piece 2A and the inner metal piece 2B in the first welding, and the first welding is performed with the irradiation intensity of the electron beam from the welding device set to be as low as possible.

By performing the first welding, the clearance at the coupling portion 30 between the first flow path 3A and the second flow path 3B, which is positioned in the joint surface 4, is sealed from the surface 23 side that is exposed to the electron beam. A small head portion 51 with a fusing depth D1 of 0.5 to 2 mm is formed over the entire range of the joint surface 4 in the circumferential direction C.

Then, as a second welding process, as illustrated in FIGS. 1 and 4, second welding is performed at the fusing depth D2, which is larger than the fusing depth D1 of the first welding, in the second range R2, which excludes the specific portion P, of the joint surface 4 in the circumferential direction C using the same welding device as the welding device which has performed the first welding. The second welding is performed with the irradiation intensity of the electron beam from the welding device set to be more intense than that during the first welding for the purpose of joining the outer metal piece 2A and the inner metal piece 2B to each other.

The second welding is performed by irradiating the electron beam onto the second range R2 of the joint surface 4 in the circumferential direction C from above the small bead portion 51 which is a welding bead formed in the first welding. In addition, the second welding is performed in the second range R2 through reciprocation alternately in one direction and the other in the circumferential direction C of the joint surface 4. In other words, the second welding is performed through continuous reciprocation of the position of irradiation of the high-energy beam between two adjacent specific portions P alternately in a first direction C1 from one of the specific portions P toward the other specific portion P along the joint surface 4 and a second direction C2 that is opposite to the first direction C1.

Figure 6:
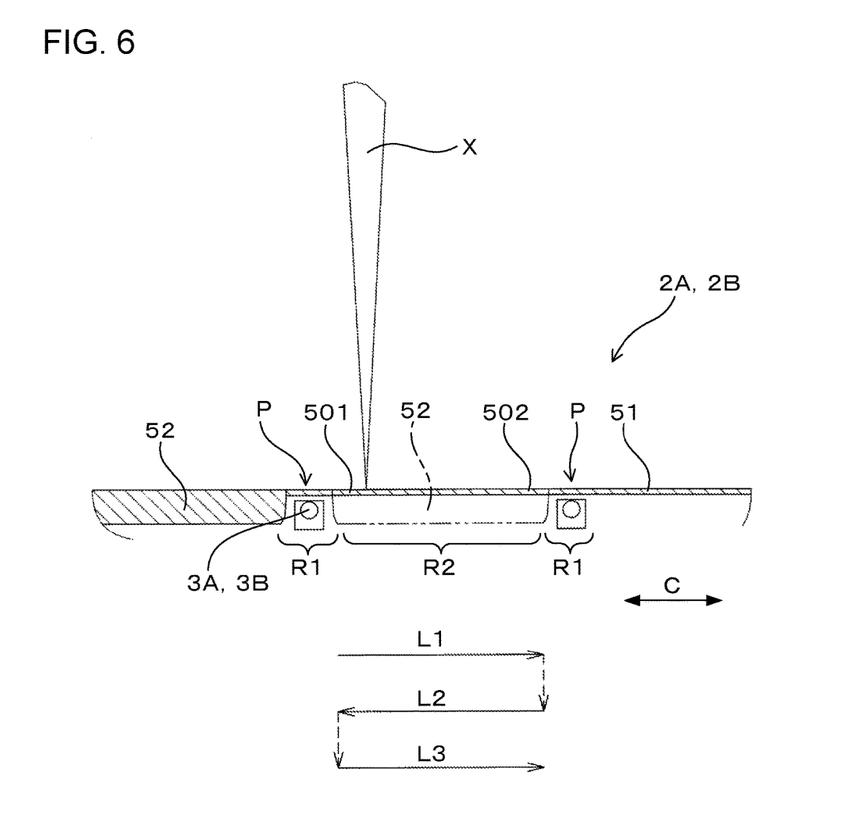
FIG. 6 illustrates a state according to the first embodiment in which a second welding is performed through reciprocation between adjacent specific portions.

As illustrated in FIG. 6, the second welding according to the embodiment is performed in one direction along the circumferential direction C of the joint surface 4 (in the first direction C1) from a first end portion 501 to a second end portion 502 of the second range R2 in a first pass L1, then in the other direction along the circumferential direction C of the joint surface 4 (in the second direction C2) from the second end portion 502 to the first end portion 501 in a second pass L2, and thereafter in the one direction along the circumferential direction C of the joint surface 4 (in the first direction C1) from the first end portion 501 to the second end portion 502 in a third pass L3. In the drawing, the electron beam is indicated by symbol X.

The fusing depth of the welding becomes larger each time the electron beam is irradiated. The large bead portion 52 with a fusing depth D2 of 4 to 10 mm is formed in the second range R2, other than the first range R1, of the joint surface 4 in the circumferential direction C.

The second welding may be started from above a portion at which the first welding has already been performed before the first welding is performed over the entire circumference of the joint surface 4 in the circumferential direction C.

Next, the function and the effect of the joint part 1 and the manufacturing method therefor according to the embodiment will be described.

The state of formation of the welding beads 51 and 52 in the joint part 1 according to the embodiment is different between the vicinity of the coupling portion 30 between the first flow path 3A and the second flow path 3B and the other portions. The small head portion 51 with the fusing depth 171 which does not reach the flow path 3 is provided in the first range R1, which includes the specific portion P which overlaps the coupling portion 30 between the first flow path 3A and the second flow path 3B when seen from the surface 23 exposed to the high-energy beam, in the circumferential direction C of the joint surface 4 between the outer metal piece 2A and the inner metal piece 2B. With the formation of the small bead portion 51, it is possible to protect the coupling portion 30 between the first flow path 3A and the second flow path 3B from fusion due to the welding.

Meanwhile, the large bead portion 52 with the fusing depth D2 which is larger than the fusing depth D1 of the small bead portion 51 is provided in the second range R2 other than the first range R1. With the formation of the large bead portion 52, it is possible to appropriately secure the joint strength between the outer metal piece 2A and the inner metal piece 2B.

With the combination of the small bead portion 51 and the large bead portion 52, in addition, either the small bead portion 51 or the large bead portion 52 is provided over the entire range of the joint surface 4 as seen from the surface 23 side that is exposed to the high-energy beam. Therefore, it is possible to prevent leakage of working oil from the coupling portion 30 between the first flow path 3A and the second flow path 3B to the surface 23 that is exposed to the high-energy beam.

Therefore, with the joint part 1 according to the embodiment, it is possible to protect the coupling portion 30 between the first flow path 3A and the second flow path 3B, to prevent leakage of a fluid from the first flow path 3A and the second flow path 3B, and to further secure the joint strength between the outer metal piece 2A and the inner metal piece 2B.

In the manufacturing method for the joint part 1, in addition, the first welding in the first welding process is performed as temporary welding which is performed before main welding between the outer metal piece 2A and the inner metal piece 2B is performed. With the first welding as temporary welding, in which the fusing depth D1 of the welding is small, it is possible to prevent portions of the outer metal piece 2A and the inner metal piece 2B positioned around the coupling portion 30 from being fused. Consequently, it is possible to prevent the first flow path 3A and the second flow path 3B from being narrowed or blocked, and to protect the coupling portion 4 from fusion due to the welding. With the first welding, in addition, the welding can be performed in a short time, and the amount of thermal deformation of the outer metal piece 2A and the inner metal piece 2B due to thermal distortion due to the welding can be suppressed to be small.

With the large bead portion 52 which is formed by the second welding in the second welding process, in which the fusing depth D2 of the welding is large, it is possible to appropriately secure the joint strength between the outer metal piece 2A and the inner metal piece 2B.

With the combination of the first welding and the second welding, in addition, either the first welding or the first welding is performed over the entire range of the joint surface 4 as seen from the surface 23 side that is exposed to the high-energy beam. Therefore, the air-tightness of the coupling portion 30 between the first flow path 3A and the second flow path 3B on the surface 23 exposed to the high-energy beam is secured. It is possible to prevent leakage of working oil from the coupling portion 30 to the surface 23 exposed to the high-energy beam. Therefore, the structure which protects the coupling portion 30 from fusion due to the welding and which secures the air-tightness of the coupling portion 30 can be simplified.

In the case where the second welding which is performed in the second range R2 other than the first range R1 is performed at a constant speed in one direction in the circumferential direction C of the joint surface 4 between the outer metal piece 2A and the inner metal piece 2B, the amount of input heat is small and the fusing depth of the welding is small at the welding start portion (start-up portion) and the welding end portion (finish portion). The second welding is performed intermittently in a plurality of second ranges R2, and therefore a large number of welding start portions and welding end portions of the second welding are formed.

Thus, the second welding which is performed in the second range R2 according to the embodiment is performed by continuously moving the position of irradiation of the high-energy beam alternately in the first direction C1 and the second direction C2 between two adjacent specific portions P. In this event, welding is performed repeatedly at the first end portion 501 as the welding start portion and the second end portion 502 as the welding end portion. Therefore, it is possible to secure the amount of heat input to the welding start portion and the welding end portion, and to make the fusing depth over the entire second range R2 more uniform.

In addition, temporary fixation between the outer metal piece 2A and the inner metal piece 2B can be performed through the first welding in which the fusing depth D1 of the welding is small, and thereafter main welding between the outer metal piece 2A and the inner metal piece 2B can be performed through the second welding in which the fusing depth D2 of the welding is large. Therefore, deformation of the outer metal piece 2A and the inner metal piece 23 due to thermal distortion due to the welding can be hindered if the outer metal piece 2A and the inner metal piece 2B have been temporarily fixed to each other in the first welding when the second welding is performed. In addition, by performing the first welding and the second welding using the same welding device, the manufacturing process for the joint part 1 in which the two types of welding are performed for manufacture can be simplified to reduce the manufacturing cost.

Second Embodiment

The embodiment describes a manufacturing method for the joint part 1 in which second welding is performed in the second range R2 at the fusing depth D2 which may reach the first flow path 3A and the second flow path 3B and thereafter first welding is performed in the first range R1 at the fusing depth D1 which does not reach the first flow path 3A and the second flow path 3B.

In the embodiment, the first welding process described in the first embodiment is performed after the second welding process described in the first embodiment is performed.

In the case where the second welding process is performed after the first welding process described in the first embodiment is performed, the following issue may be involved.

When the first welding is performed in the circumferential direction C of the joint surface 4 between the outer metal piece 2A and the inner metal piece 2B, the metal material near the surface 23 on the side exposed to the high-energy beam is fused and resolidified. In this case, the metal material is subjected to solidification shrinkage at portions of the outer metal piece 2A and the inner metal piece 2B at the fusing depth D1 of the small bead portion 51 which is formed through the first welding, and the metal material is not subjected to solidification shrinkage at portions at depths larger than the fusing depth D1. As a result, a clearance may be formed between the outer metal piece 2A and the inner metal piece 2B at portions of the joint surface 4 at depths larger than the fusing depth D1, in particular at portions at depths larger than the depth at which the first flow path 3A and the second flow path 3B are formed.

When the second welding is performed in the circumferential direction C of the joint surface 4 between the outer metal piece 2A and the inner metal piece 2B in the case where such a clearance is formed, the metal material on the joint surface 4 at portions at which the second welding is performed may not be fused completely because of the clearance. The joint strength between the outer metal piece 2A and the inner metal piece 2B may not be secured appropriately when the large bead portion 52 is formed through the second welding. In the case where the clearance is large, in addition, it may be difficult to secure the air-tightness of the coupling portion 30 between the first flow path 3A and the second flow path 3B.

In the embodiment, the first welding process is performed in the entire joint surface 4 in the circumferential direction C or the first range R1 of the joint surface 4 after the second welding is performed in the second range R2.

When the second welding is performed, the metal material on the joint surface 4 between the outer metal piece 2A and the inner metal piece 2B not only at shallow portions but also at deep portions can be fused. Consequently, the metal material in a wide range, from shallow portions to deep portions, in the second range R2 of the joint surface 4 can be fused and subjected to solidification shrinkage, which makes it possible to secure a sufficient joint strength between the outer metal piece 2A and the inner metal piece 2B. With the outer metal piece 2A and the inner metal piece 2B strongly joined to each other, no such deformation as to form a clearance at deep portions in the first range R1 in which the first welding is performed is caused when the first welding is performed after the second welding is performed. Consequently, it is possible to secure the joint strength between the outer metal piece 2A and the inner metal piece 2B, and to effectively secure the air-tightness of the coupling portion 30 between the first flow path 3A and the second flow path 3B.

The first welding according to the embodiment can be performed over the entire joint surface 4 between the outer metal piece 2A and the inner metal piece 2B in the circumferential direction C. In addition, the first welding according to the embodiment can be performed only in the first range R1 of the joint surface 4 in the circumferential direction C. The first welding according to the embodiment is preferably performed only in the first range R1 particularly in the case where the outer metal piece 2A and the inner metal piece 2B which are easily deformed by input heat are to be welded to each other.

The advantage of a case where the first welding is performed after the second welding is performed has been described in relation to the embodiment. It can be determined which of the first welding and the second welding is performed first in accordance with the type of the outer metal piece 2A and the inner metal piece 2B as workpieces to be welded or the like. Specifically, it can be determined which of the first welding and the second welding is performed first in consideration of differences in material (thermal conductivity), shape, amount of solidification shrinkage during heating and cooling, amount of heat input under conditions of irradiation of a high-energy beam during welding, etc. of the workpieces to be welded.

In addition, it can be determined which of the first welding and the second welding is performed first in consideration of deformation caused in the outer metal piece 2A and the inner metal piece 2B by the first welding and deformation caused in the outer metal piece 2A and the inner metal piece 2B by the second welding.

Other components and constituent elements indicated by the symbols in the drawings according to the embodiment are similar to those according to the first embodiment, and functions and effects that are similar to those of the first embodiment can be obtained. In addition, the present disclosure is not limited to each of the embodiments described above, and further different embodiments can be constituted without departing from the scope and spirit of the present disclosure.

The invention claimed is:

1. A manufacturing method for a joint part in which a first metal piece and a second metal piece are joined to each other by performing welding by irradiating a high-energy beam to a joint surface on which the first metal piece and the second metal piece face each other, the first metal piece including a first flow path for passage of a fluid provided at a specific depth from a surface on a side exposed to the high-energy beam, the second metal piece including a second flow path for passage of the fluid provided at a specific depth from the surface on the side exposed to the high-energy beam, and the first flow path and the second flow path being coupled to each other on the joint surface, the manufacturing method comprising:
performing a first welding in which welding is performed at a fusing depth that does not reach a coupling between the first flow path and the second flow path in a first range of the joint surface, the first range including a specific portion that overlaps the coupling as seen from the surface side that is exposed to the high-energy beam; and
performing a second welding in which welding is performed at a fusing depth that is larger than the fusing depth of the first welding in a second range of the joint surface, the second range excluding the specific portion.

2. The manufacturing method for a joint part according to claim 1, wherein
the second welding is performed after the first welding is performed.

3. The manufacturing method for a joint part according to claim 2, wherein
the first range is an entire range of the joint surface as seen from the surface side that is exposed to the high-energy beam.

4. The manufacturing method for a joint part according to claim 3, wherein
the first metal piece is an outer metal piece that has a through hole, and the second metal piece is an inner metal piece fitted into the through hole, and
the joint surface is formed by an inner peripheral surface of the through hole and an outer peripheral surface of the inner metal piece.

5. The manufacturing method for a joint part according to claim 3, wherein
the specific portion is formed at a plurality of locations on the joint surface as seen from the surface side that is exposed to the high-energy beam, and
the second welding is performed through continuous reciprocation of a position of irradiation of the high-energy beam between two adjacent specific portions alternately in a first direction from one of the specific portions toward the other specific portion along the joint surface and a second direction that is opposite to the first direction.

6. The manufacturing method for a joint part according to claim 2, wherein
the first metal piece is an outer metal piece that has a through hole, and the second metal piece is an inner metal piece fitted into the through hole, and
the joint surface is formed by an inner peripheral surface of the through hole and an outer peripheral surface of the inner metal piece.

7. The manufacturing method for a joint part according to claim 6, wherein
the specific portion is formed at a plurality of locations on the joint surface as seen from the surface side that is exposed to the high-energy beam, and
the second welding is performed through continuous reciprocation of a position of irradiation of the high-energy beam between two adjacent specific portions alternately in a first direction from one of the specific portions toward the other specific portion along the joint surface and a second direction that is opposite to the first direction.

8. The manufacturing method for a joint part according to claim 2, wherein
the specific portion is formed at a plurality of locations on the joint surface as seen from the surface side that is exposed to the high-energy beam, and
the second welding is performed through continuous reciprocation of a position of irradiation of the high-energy beam between two adjacent specific portions alternately in a first direction from one of the specific portions toward the other specific portion along the joint surface and a second direction that is opposite to the first direction.

9. The manufacturing method for a joint part according to claim 1, wherein
the first welding is performed after the second welding is performed.

10. The manufacturing method for a joint part according to claim 9, wherein
the first range is an entire range of the joint surface as seen from the surface side that is exposed to the high-energy beam.

11. The manufacturing method for a joint part according to claim 10, wherein
the first metal piece is an outer metal piece that has a through hole, and the second metal piece is an inner metal piece fitted into the through hole, and
the joint surface is formed by an inner peripheral surface of the through hole and an outer peripheral surface of the inner metal piece.

12. The manufacturing method for a joint part according to claim 10, wherein
the specific portion is formed at a plurality of locations on the joint surface as seen from the surface side that is exposed to the high-energy beam, and
the second welding is performed through continuous reciprocation of a position of irradiation of the high-energy beam between two adjacent specific portions alternately in a first direction from one of the specific portions toward the other specific portion along the joint surface and a second direction that is opposite to the first direction.

13. The manufacturing method for a joint part according to claim 9, wherein
the first metal piece is an outer metal piece that has a through hole, and the second metal piece is an inner metal piece fitted into the through hole, and the joint surface is formed by an inner peripheral surface of the through hole and an outer peripheral surface of the inner metal piece.

14. The manufacturing method for a joint part according to claim 13, wherein the specific portion is formed at a plurality of locations on the joint surface as seen from the surface side that is exposed to the high-energy beam, and the second welding is performed through continuous reciprocation of a position of irradiation of the high-energy beam between two adjacent specific portions alternately in a first direction from one of the specific portions toward the other specific portion along the joint surface and a second direction that is opposite to the first direction.

15. The manufacturing method for a joint part according to claim 9, wherein the specific portion is formed at a plurality of locations on the joint surface as seen from the surface side that is exposed to the high-energy beam, and the second welding is performed through continuous reciprocation of a position of irradiation of the high-energy beam between two adjacent specific portions alternately in a first direction from one of the specific portions toward the other specific portion along the joint surface and a second direction that is opposite to the first direction.

16. A joint part comprising;

a first metal piece; and a second metal piece joined to the first metal piece on a joint surface on which the first metal piece and the second metal piece face each other, wherein:

the first metal piece includes a first flow path for passage of a fluid provided at a specific depth from a specific surface, the second metal piece includes a second flow path for passage of the fluid provided at a specific depth from the specific surface, and the first flow path and the second flow path are coupled to each other on the joint surface;

a small bead portion with a fusing depth that does not reach a coupling between the first flow path and the second flow path is provided in a first range of the joint surface, the first range including a specific portion that overlaps the coupling as seen from the specific surface side; and a large bead portion with a fusing depth that is larger than the fusing depth of the small bead portion is provided in a second range of the joint surface, the second range excluding the specific portion.

17. The joint part according to claim 16, wherein:

the first metal piece is an outer metal piece that has a through hole, and the second metal piece is an inner metal piece fitted into the through hole; and the joint surface is formed by an inner peripheral surface of the through hole and an outer peripheral surface of the inner metal piece.

18. The joint part according to claim 17, wherein:

the joint part which is constituted from the first metal piece and the second metal piece is a clutch drum;

the clutch drum defines an oil chamber for engagement of a clutch together with a piston housed in the clutch drum; and the first flow path and the second flow path are formed as oil paths that supply working oil to the oil chamber.

* * * * *